US009792952B1

(12) United States Patent
Gilbert et al.

(10) Patent No.: US 9,792,952 B1
(45) Date of Patent: Oct. 17, 2017

(54) AUTOMATED TELEVISION PROGRAM EDITING (71) Applicant: Kill the Cann, LLC, Tampa, FL (US)

(72) Inventors: Keith Gilbert, Berlin, MA (US); Geoffrey F. Gross, Tampa, FL (US); Joel MacAuslan, Nashua, NH (US)

(73) Assignee: Kill the Cann, LLC, Tampa, FL (US)

( * ) Notice: Subject to any disclaimer, the term of this patent is extended or adjusted under 35 U.S.C. 154(b) by 139 days.

(21) Appl. No.: 14/928,308

(22) Filed: Oct. 30, 2015

Related U.S. Application Data (60) Provisional application No. 62/073,644, filed on Oct. 31, 2014.

(51) Int. Cl.
*G06F 17/00* (2006.01)
*G11B 27/031* (2006.01)

(52) U.S. Cl.
CPC .................................. *G11B 27/031* (2013.01)

(58) Field of Classification Search
CPC ...................................................... G11B 27/031
See application file for complete search history.

(56) References Cited

U.S. PATENT DOCUMENTS

| | | | | |
|---|---|---|---|---|
| 5,375,188 A * | 12/1994 | Serikawa | ............ | G10H 1/0091 381/11 |
| 8,577,676 B2 * | 11/2013 | Muesch | .................. | H04R 5/04 704/225 |
| 9,363,603 B1 * | 6/2016 | Cabot | .................... | H04S 3/008 |
| 9,621,124 B2 * | 4/2017 | Lu | .......................... | H03G 5/005 |
| 2004/0213420 A1 * | 10/2004 | Gundry | ................. | H03G 7/004 381/104 |
| 2004/0213421 A1 * | 10/2004 | Jacobs | ...................... | H04S 7/00 381/104 |
| 2005/0232445 A1 * | 10/2005 | Vaudrey | ........... | G11B 20/00992 381/109 |
| 2007/0027682 A1 * | 2/2007 | Bennett | .............. | G10L 21/0272 704/215 |
| 2008/0263580 A1 * | 10/2008 | Kondo | .................... | G10L 17/26 725/12 |
| 2009/0141912 A1 * | 6/2009 | Hiekata | ................. | H04R 3/007 381/122 |
| 2011/0054887 A1 * | 3/2011 | Muesch | .................. | H04S 3/00 704/225 |
| 2011/0224980 A1 * | 9/2011 | Nakadai | ................. | G10L 15/20 704/233 |

* cited by examiner

*Primary Examiner* — Joseph Saunders, Jr.
(74) *Attorney, Agent, or Firm* — Blueshift IP, LLC; Robert Plotkin (57) ABSTRACT

The available audio tracks of a multi-track television program are processed to remove or reduce certain components of the program, especially audience sounds, such as laughter. Such processing may be particularly applicable to "canned" laughter. This applies to any program which is supplied with a plurality of audio channels, whether provided by cable, DVD, Internet streaming, or otherwise.

24 Claims, 5 Drawing Sheets

AUTOMATED TELEVISION PROGRAM EDITING

STATEMENT AS TO FEDERALLY SPONSORED RESEARCH

This invention was made with Government support under National Institutes of Health (NIH) Grant Number R44-DC010104, entitled, "Innovation Speech Articulation Tools for Neuroscience Research," commencement date Jan. 1, 2012. The Government has certain rights in the invention.

BACKGROUND

The audio tracks of a multi-channel television program typically contain signals representing laughter and/or other sounds that would be desirable to filter from the program. Such filtering may be desirable, for example, when the program contains too much laughter, such as when the laughter is too loud for the actors to be heard well, especially for hearing-impaired listeners.

SUMMARY

The available audio tracks of a multi-track television program are processed to remove or reduce certain components of the program, especially audience sounds, such as laughter. Such processing may be particularly applicable to "canned" laughter. This applies to any program which is supplied with a plurality of audio channels, whether provided by cable, DVD, Internet streaming, or otherwise.

Other features and advantages of various aspects and embodiments of the present invention will become apparent from the following description and from the claims.

DETAILED DESCRIPTION

Figure 1:
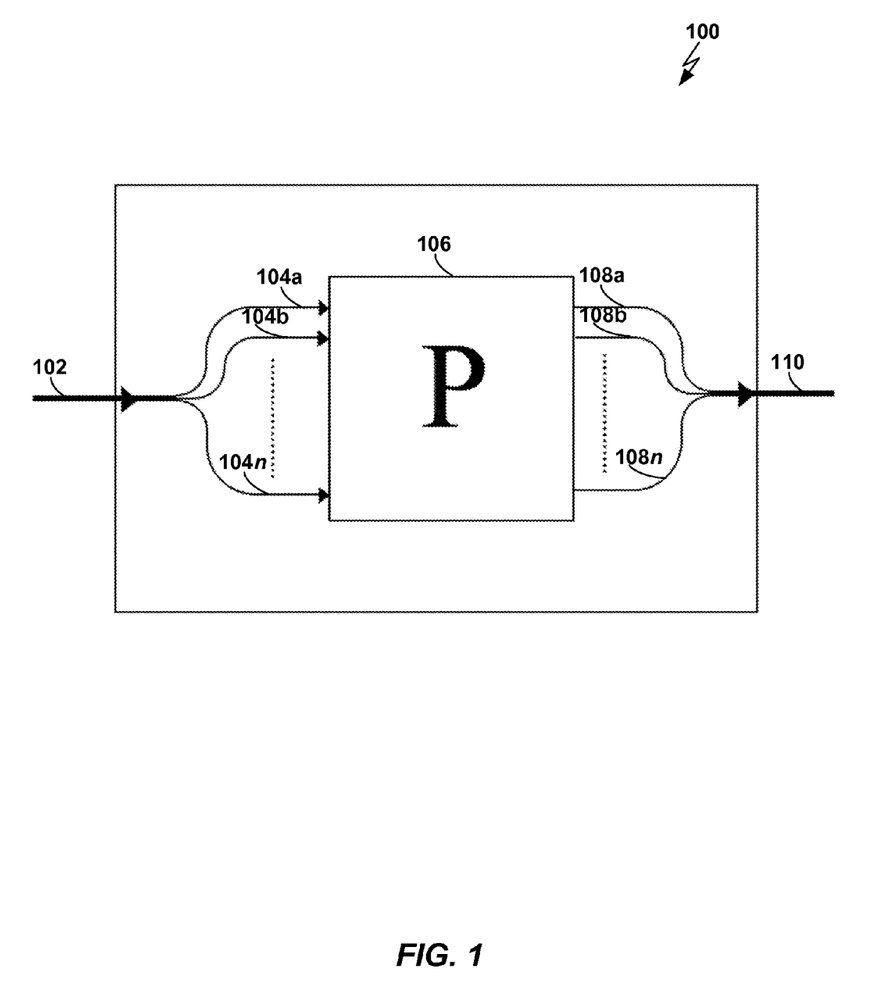
FIG. 1 is a diagram representing a system for implementing one embodiment of the present invention.

Referring to FIG. 1, a diagram representing a system 100 for implementing one embodiment of the present invention is shown. In FIG. 1, a single, multi-channel electronic audio stream 102 enters from left. The system 100 splits the audio stream 102 into single input channels 104a-n, where n may be any integer greater than or equal to two. Block P 106 collectively processes the input channels 104a-n, thereby producing processed channels 108a-n, which correspond to input channels 104a-n, respectively. (In practice, any one or more of the input channels 104a-n may not be processed, thereby causing the block P 106 to produce fewer than all of the processed channels 108a-n.) The system 100 assembles the output channels 108a-n into a multi-channel audio stream 110, which the system 100 produces as output on the right. The terms "channel" and "track" are used interchangeably herein.

Figure 2:
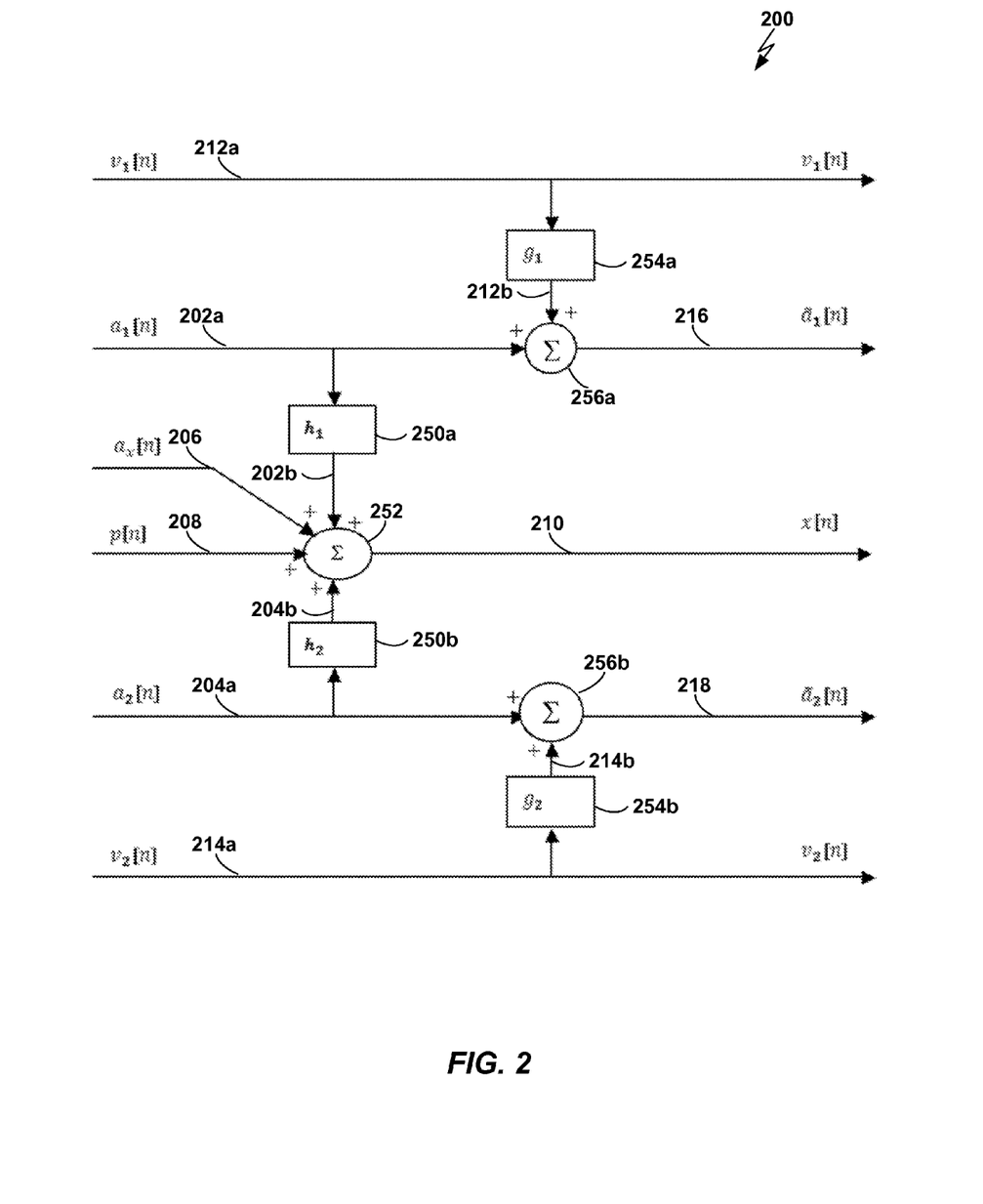
FIG. 2 is an illustration of a mixing module for implementing a mixing model of five-channel audio according to one embodiment of the present invention.

Referring to FIG. 2, a mixing module 200 for implementing a mixing model of five-channel audio according to one embodiment of the present invention is shown. The mixing module 200 receives original left and right audience signals $a_1[n]$ 202a and $a_2[n]$ 204a as inputs. The mixing module 200 includes filter $h_1$ 250a, which filters the original left audience signal $a_1[n]$ 202a to produce filtered left audience signal 202b. The mixing module 200 also includes filter $h_2$ 250b, which filters the original right audience signal $a_2[n]$ 204a to produce filtered right audience signal 204b.

The mixing module 200 also receives a middle audience signal, $a_x[n]$ 206, and a performers' signal, $p[n]$ 208, as inputs. The mixing module 200 includes an adder 252, which combines the filtered left audience signal 202b, the filtered right audience signal 204b, the middle audience signal 206, and the performers' signal 208, to create a main performance track $x[n]$ 210.

The mixing module 200 also receives original left music/sound effect track, $v_1[n]$ 212a, and original right music/sound effect track, $v_2[n]$ 214a, as inputs. The mixing module 200 also includes filter $g_1$ 254a, which filters the original left music/sound effect track $v_1[n]$ 212a to produce filtered left music/sound effect track 212b. The mixing module 200 also includes filter $g_2$ 254b, which filters the original right music/sound effect track $v_2[n]$ 214a to produce filtered right music/sound effect track 214b.

The mixing module 200 also includes adders 256a and 256b. Adder 256a combines the filtered left music/sound effect track 212b with the original left audience signal 202a to produce left audience track $\tilde{a}_1[n]$ 216. Adder 256b combines the filtered right music/sound effect track 214b with the original right audience signal 204b to produce right audience track $\tilde{a}_2[n]$ 218.

As shown in FIG. 2, the mixing module 200 produces the signals $v_1[n]$ 212a, $v_2[n]$ 214a, $\tilde{a}_1[n]$ 216, $\tilde{a}_2[n]$ 218, and $x[n]$ 210 as outputs. The mixing module 200 may, for example, provide the signals $v_1[n]$ 212a, $v_2[n]$ 214a, $\tilde{a}_1[n]$ 216, $\tilde{a}_2[n]$ 218, and $x[n]$ 210 in HDMI 5.1 format. Any one or more of the other signals and filters shown in FIG. 2 may or may not be present in actual implementations of the mixing module 200, and may instead merely be illustrated in FIG. 2 to model the generation of the signals $v_1[n]$ 212a, $v_2[n]$ 214a, $\tilde{a}_1[n]$ 216, $\tilde{a}_2[n]$ 218, and $x[n]$ 210.

Figure 3:
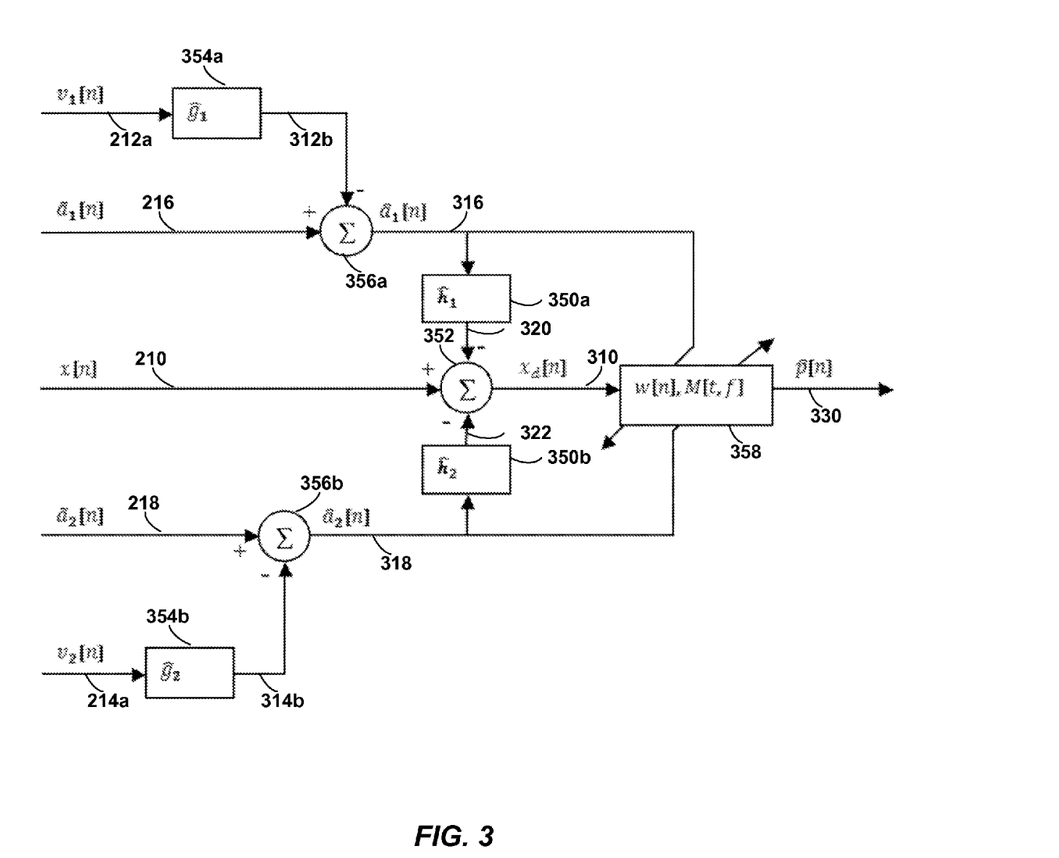
FIG. 3 is an illustration of an audience removal module for removing audience sounds, such as laughter, from a performance track according to one embodiment of the present invention.
Figure 4:
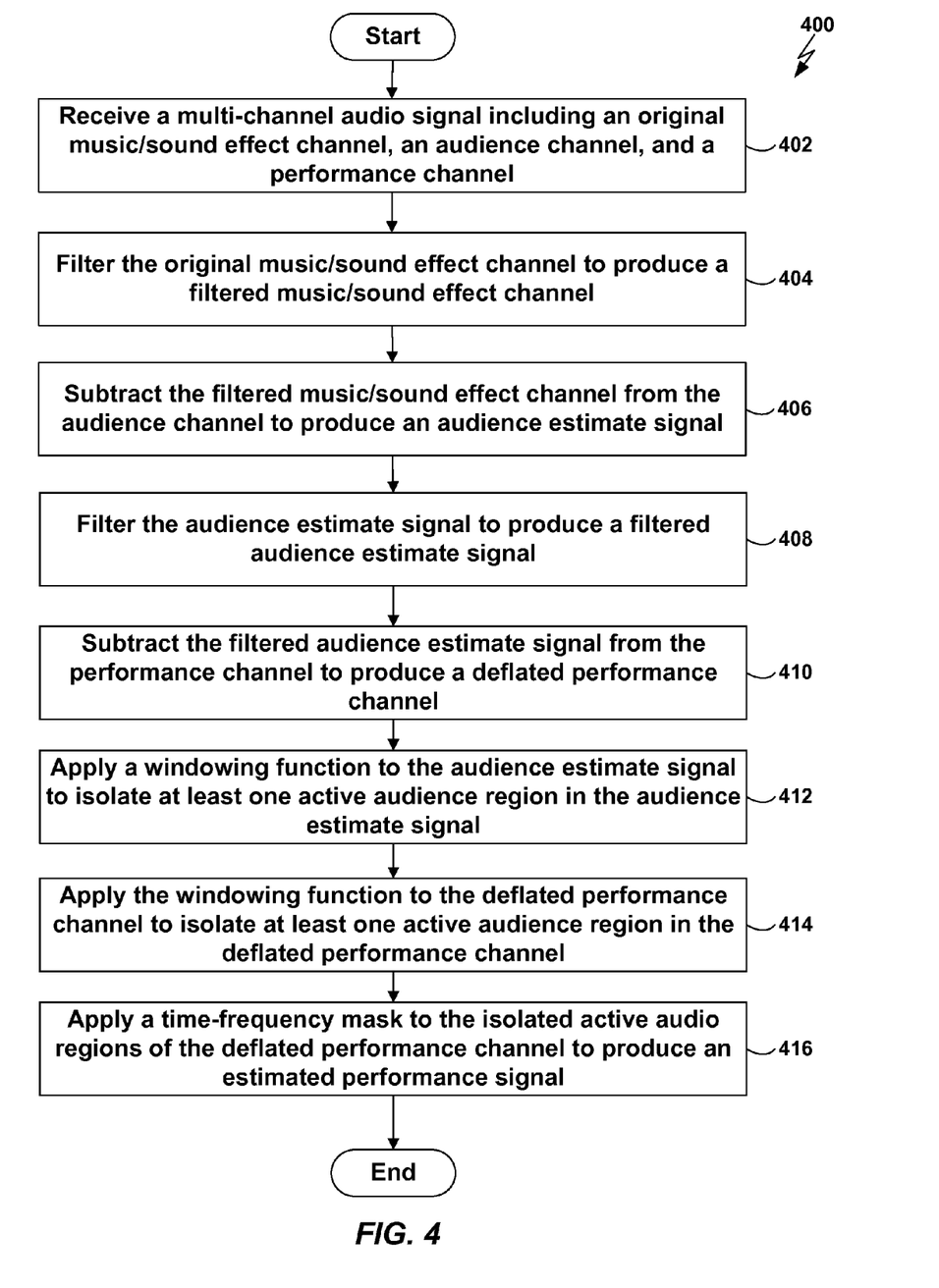
FIG. 4 is a flowchart of a method performed by one embodiment of the present invention.

Referring to FIG. 3, an audience removal module 300 for removing audience sounds (e.g., laughter) from a performance track according to one embodiment of the present invention is shown. FIG. 3 uses the same notation as FIG. 2 for ease of explanation and illustration. Referring to FIG. 4, a flowchart is shown of a method 400 performed by the module 300 of FIG. 3 according to one embodiment of the present invention.

The audience removal module 300 receives the signals $v_1[n]$ 212a, $v_2[n]$ 214a, $\tilde{a}_1[n]$ 216, $\tilde{a}_2[n]$ 218, and $x[n]$ 210 as inputs (FIG. 4, operation 402). Note that these signals do not need to have been output by the mixing module 200 of FIG. 2 or have been generated in any particular manner, such as in the manner illustrated in FIG. 2. Instead, the input signals $v_1[n]$ 212a, $v_2[n]$ 214a, $\tilde{a}_1[n]$ 216, $\tilde{a}_2[n]$ 218, and $x[n]$ 210 shown in FIG. 3 may be any suitable input signals, such as any suitable input signals in an HDMI 5.1 format, regardless of how such signals were generated.

The audience removal module 300 includes left estimated music/sound effects filter $\hat{g}_1$ 354a and right estimated music/sound effects filter $\hat{g}_2$ 354b. The left estimated music/sound effects filter $\hat{g}_1$ 354a filters the original left music/sound effect track, $v_1[n]$ 212a, to produce filtered left music/sound effect track 312b (FIG. 4, operation 404). The right estimated music/sound effects filter $\hat{g}_2$ 354b filters the original right music/sound effect track, $v_2[n]$ 214a, to produce filtered right music/sound effect track 314b (FIG. 4, operation 404).

The audience removal module 300 also includes a subtractor 356a. Subtractor 356a removes music/sound effects from the left audience track $\tilde{a}_1[n]$ 216 by subtracting the filtered left music/sound effect track 312b from the left audience track $\tilde{a}_1[n]$ 216, thereby producing a signal, $\hat{a}_1[n]$ 316, representing an estimate of the left audience (FIG. 4, operation 406).

The audience removal module 300 also includes a subtractor 356b. Subtractor 356b removes music/sound effects from the right audience track $\tilde{a}_2[n]$ 218 by subtracting the filtered right music/sound effect track 314b from the right audience track $\tilde{a}_2[n]$ 218, thereby producing a signal, $\hat{a}_2[n]$ 318, representing an estimate of the right audience (FIG. 4, operation 406).

The audience removal module 300 also includes a left estimated audience filter, $\hat{h}_1$ 350a. The left estimated audience filter $\hat{h}_1$ 350a filters the left estimated audience signal $\hat{a}_1[n]$ 316, thereby producing a filtered left estimated audience signal 320 (FIG. 4, operation 408).

The audience removal module 300 also includes a right estimated audience filter, $\hat{h}_2$ 350b. The right estimated audience filter $\hat{h}_2$ 350b filters the right estimated audience signal $\hat{a}_2[n]$ 318, thereby producing a filtered right estimated audience signal 322 (FIG. 4, operation 408).

The audience removal module 300 also includes an subtractor 352, which subtracts both the filtered left estimated audience signal 320 and the filtered right estimated audience signal 322 from the main performance track $x[n]$ 210 to produce a deflated performance track, $x_d[n]$ 310 (FIG. 4, operation 410).

The audience removal module 300 also includes a windowing function and time frequency mask module 358. The module 358 receives as inputs the left audience estimate signal $\hat{a}_1[n]$ 316, the right audience estimate signal $\hat{a}_2[n]$ 318, and the deflated performance track $x_d[n]$ 310 to tune the parameters of a windowing function $w[n]$. The audience removal module 300 applies the windowing function $w[n]$ to the left audience estimate signal $\hat{a}_1[n]$ 316, the right audience estimate signal $\hat{a}_2[n]$ 318, and the deflated performance track $x_d[n]$ 310, and isolates the active audience regions in those signals (FIG. 4, operations 412 and 414). The purpose of, and the function performed by, the windowing function $w[n]$ is to determine whether the filters 350a and 350b have removed the audience sounds properly from the main performance track $x[n]$ 210, as reflected in the resulting deflated performance track $x_d[n]$ 310.

The module 358 applies a time-frequency mask, $M[t,f]$, to the isolated active audience regions output by the windowing function $w[n]$, thereby producing as output a signal $\hat{p}[n]$ 330, which is an estimate of the performers' signal (FIG. 4, operation 416). The signals $v_1[n]$ 212a, $v_2[n]$ 214a, $\tilde{a}_1[n]$ 216, $\tilde{a}_2[n]$ 218, and $x[n]$ 210 may, for example, be received by the audience removal module 300 in HDMI 5.1 format. Any one or more of the other signals and filters shown in FIG. 3 may or may not be present in actual implementations of the audience removal module 300, and may instead merely be illustrated in FIG. 3 to model such signals and filters.

In the typical HDMI 5.1 channel scenario, two channels (left and right) are devoted to a combination of sound effects, audience, and theme song (audience tracks), one channel is devoted to a combination of the actors and the audience (performance track), two channels (left and right) are devoted to sound effects and the theme song (effects tracks), and one channel is devoted to low-frequency content of possibly any of the first five channels (low track). The term "actor" and "performer" are used interchangeably herein. We now describe how embodiments of the present invention may be used to remove the audience from the performance track in the typical 5.1 channel case. This embodiment is disclosed merely as an example and not as a limitation of the present invention.

Those having ordinary skill in the art will understand, based on the disclosure herein, how to remove the audience (partially or entirely) from the performance track in scenarios involving any number of channels, such as two, three, four, five, or more channels. Furthermore, although particular kinds of tracks are disclosed herein, such as audience tracks, performance tracks, effects tracks, and low tracks, embodiments of the present invention are not limited to application in connection with these particular kinds of tracks. More generally, embodiments of the present invention may be used to remove the audience (partially or entirely) from any two or more channels, where the channels may include channels including any combination of channel types.

Although the following description may refer generally to performing various operations, such as filtering, on various signals, those having ordinary skill in the art will understand how to use apply the following description to the systems and modules of FIGS. 1, 2, and 3 herein.

To begin, we denote the left and right audience tracks as $\tilde{a}_1[n]$ and $\tilde{a}_2[n]$, respectively, the performance track as $x[n]$, and the left and right effects tracks as $v_1[n]$ and $v_2[n]$, respectively, where n is the sample number. Note that the left [resp., right] audience track contains contributions from both the left [resp., right] side of the audience and the left [resp. right] effects track. For simplicity, but without loss of generality, we may assume the audience tracks decompose to $\tilde{a}_i[n]=a_i[n]+(g_i*v_i)[n]$, for $i=1,2$, where $a_i[n]$ is the audience's contribution to the $i^{th}$ audience track, $g_i[n]$ is a filter, and * denotes convolution. As shown in FIG. 2, the performance track may be modeled as, $$x[n] = p[n] + a_x[n] + \sum_{i=1}^{2}(h_i * a_i)[n]$$

where $P[n]$ is the performer's contribution, $a_x[n]$ is the "middle" audience's contribution, and $h_i[n]$ are filters. The goal, therefore, is to produce an estimate, $\hat{p}[n]$, of $p[n]$.

Assuming that we only wish to process the regions of the signals containing audience participation, we first estimate $g_i[n]$ as $\hat{g}_i[n]$ for $i=1,2$ via, for example, a batch or adaptive estimation technique, e.g. a maximum-a-posteriori fit, LMS (least mean squares), or any other linear or nonlinear estimation technique. An estimate of $a_i[n]$ is then obtained as $\hat{a}_i[n]=\tilde{a}_i[n]-(\hat{g}_i*v_i)[n]$. Next, regions where the audience is active may be isolated in any of a variety of ways, such as by calculating the amplitude envelopes, $m_i[n]$ for $i=1,2$, of the respective audience estimates, $\hat{a}_i[n]$. Windowing functions, $u_i[n]$ for $i=1,2$ may then be created such that $u_i[n]=1$ for $m_i[n] \geq T_{a,i}$ and $u_i[n]=0$ for $m_i[n] < T_{a,i}$, where $T_{a,i}$ is a threshold determined, for example, from $m_i[n]$. For example, $T_{a,i}$ may be 10% of the mean of $m_i[n]$, although any other suitable method may be used for determining a threshold. A composite window, u[n], may then be constructed via $u[n]=u_1[n] \| u_2[n]$ where $\|$ is the logical OR operator. We may then remove the estimated audience components, $\hat{a}_i[n]$, from the windowed performance track, such as by estimating $\hat{h}_i[n]$ to produce the deflated performance track, given by $x_d[n]=u[n](x[n]-\Sigma_i(\hat{h}_i * \hat{a}_i)[n])$.

A voice activity detector may be used to identify the regions of actor activity based on the deflated performance signal. In particular, the voice activity detector may be used to identify where, in the deflated performance signal, the actors are speaking in the presence of audience sounds, such as laughter, in one or more individual channels of multichannel (e.g., HDMI 5.1) audio. In other words, the voice activity detector may distinguish actor voice activity from audience sounds, such as laughter, in a particular channel.

For example, the voice activity detector may identify actor voice activity by using the landmarks and deg_voiced functions, respectively, provided in the SpeechMark® MATLAB® Toolbox, to calculate pitch contours and a measure of voicing in the main performance track x[n] 210, the deflated performance track $x_d[n]$ 310, or both. In general, a "contour" is a temporal profile of a scalar quantity. A "pitch contour" is a temporal profile of an actor's vocal pitch, which varies over time. An actor's pitch contour is one important audio indicator that an actor is speaking. In general, a "measure of voicing" is any contour that indicates whether an actor is talking (where whispering is not considered to be talking). Examples of a measure of voicing are loudness and pitch, especially if they are modulated and occur within speech-appropriate frequency ranges and time scales. Modulation is based on normal human speech, in which a typical syllable lasts approximately 0.25 seconds, and in which the pauses between segments of speech (typically between clauses and sentences) also typically last approximately 0.25 seconds. Modulation time scales, therefore, will typically be approximately 0.25 seconds. The typical pitch range is approximately 100-200 Hz for males and approximately 150-350 Hz for females, and is higher for young children. The range of frequencies relevant for speech is approximately 100-3500 Hz, which is far higher than pitch itself.

The "actor active" windowing function, $w_a[n]=1$ or 0, signals when the actor is active or inactive and may be created by setting $w_a[n]=1$ when both the pitch contour is greater than a predetermined threshold (typically zero) and the degree of voicing is greater than a predetermined threshold (typically in the range of 30%-50%) and setting $w_a[n]=0$, otherwise. This window may be extended to earlier times by any amount, such as an amount in the range 50 ms to 125 ms (e.g., 100 ms) and/or to later times by any amount, such as an amount in the range 50 ms to 100 ms (e.g., 80 ms) to include unvoiced speech. Such extension(s) of the window may be configured advantageously to provide a tradeoff between increased removal of audience content and undesired removal of performer content. Embodiments of the present invention may enable the left and/or right extension amounts to be user-configurable, such as by providing a user interface (e.g., one or more sliders) controllable by user input to modify the amount(s) of the earlier-time and/or later-time extensions. The dilated version of $w_a[n]$, which we denote as $w_{ad}[n]$, may be applied to the deflated performance track to produce $p_a[n]=w_{ad}[n]x_d[n]$. We should note that, typically, this suppresses more than 90% of the total audience participation from the performance track, but still leaves the "middle" audience when the actors are active.

The "middle" audience may be removed in any of a variety of ways. For example, in order to remove the "middle" audience, $a_x[n]$, from regions where the actor is active, a binary time-frequency mask may be constructed by modeling the middle audience as an average of the left and right audiences. First, embodiments of the present invention may convolve (2 dimensionally) the magnitude of the short-time Fourier transforms (STFTs) of the effects-removed audience tracks, and) the deflated performance track with a $K_f \times K_t$ inverted Gaussian kernel to produce the respective sharpened STFTs, $\tilde{S}_x[t,f]=(|X_d|J_K)[t,f]$ and $\tilde{S}_i[t,f]=(|A|J_K)[t,f]$, where $X_d[t,f]=\mathcal{F}\{x_d[n]\}$, $A_i[t,f]=\mathcal{F}\{\hat{a}_i[n]\}$ for i=1,2, $\mathcal{F}\{\cdot\}$ denotes the (short-time) Fourier transform, t is time or sample number, f is frequency, ** denotes two-dimensional convolution, $J_K[t,f]=1-G_K[t,f]$, $G_K[t,f]$ is a $K_f \times K_t$ Gaussian kernel, $K_f$ is the kernel size in frequency (typically spanning about 20 Hz), and $K_t$ is the kernel size in time (typically spanning about 8 ms). A preemphasis filter (a scaling linearly increasing with frequency), P[f], may then be applied to the sharpened STFTs to increase the power of the high-frequency features as $S_x[t,f]=\tilde{S}_x[t,f]P[f]$ and $S_i[t,f]=\tilde{S}_i[t,f]P[f]$. Binary masks $M_i[t,f]$ and $M_x[t,f]$ may then be created from dominant spectral features according to, respectively, $$M_i[t,f] = \begin{cases} 1, & S_i[t,f] \geq T_i \\ 0, & \text{otherwise} \end{cases}$$

and $$M_x[t,f] = \begin{cases} 1, & S_x[t,f] \geq T_x \\ 0, & \text{otherwise} \end{cases}$$

where $$T_z = \min_{t,f} S_z[t,f] + c\left(\max_{t,f} S_z[t,f] - \min_{t,f} S_z[t,f]\right)$$

(z=x or i) and c is a small constant in the range $0<c\leq 1$ with a typical value of 0.06. A composite mask, M[t,f], may then be created to suppress the common dominant spectral features present in the deflated performance track by $M[t,f]=\overline{M}_{12}[t,f]M_x[t,f]$, where $\overline{M}_{12}[t,f]$ is the complement of $M_{12}[t,f]=M_1[t,f] \& M_2[t,f]$ with & being the logical AND operation. An estimate of the performers may then be constructed as $\hat{p}[n]=\mathcal{F}^{-1}\{M[t,f]X_d[t,f]\}$ with $\mathcal{F}^{-1}\{\cdot\}$ being the inverse (short-time) Fourier transform.

Embodiments of the present invention have a variety of advantages. For example, embodiments of the present invention may be used to process the available audio tracks of a multi-track television program to remove or reduce certain components of the program, especially audience sounds, such as laughter. Such processing may be particularly applicable to "canned" laughter. The result is one or more audio channels in which such audience sounds have been removed or reduced, thereby making it easier for the voices of the actors to be heard, especially for hearing-impaired listeners.

Embodiments of the present invention may perform their processing in real-time. One benefit of real-time processing is that it allows a television viewer to watch a live television program with audience sounds reduced or removed without any delay. In general, processing is "real-time processing," as that term is used herein when, across all possible inputs, a sufficiently fast processor can always obtain enough data to perform the processing in an amount of time that is no greater than some upper bound, as measured by the delay between receipt of the processing's inputs and production of the processing's outputs. As examples but not limitations, embodiments of the present invention may produce their outputs (e.g., any one or more of the signals 212a, 216, 210, 218, and 214a in FIG. 2, and/or the signal 330 in FIG. 3) no more than 1 millisecond, no more than 5 milliseconds, no more than 10 milliseconds, no more than 20 milliseconds, no more than 30 milliseconds, no more than 40 milliseconds, or no more than 50 milliseconds of receiving their inputs (e.g., any one or more of the signals 212a, 202a, 206, 208, 204a, and 214a in FIG. 2, and/or any one or more of the signals 212a, 216, 210, 218, and 214a in FIG. 3). Processing performed within no more than any of the maximum delays listed in the previous sentence is an example of "real-time processing," as that term is used herein.

If a particular processor is not able to perform processing in real time at any one or more times, those having ordinary skill in the art will understand how to configure the processor to buffer audio as necessary to perform non-real-time processing on such audio. At the present time, processors which are capable of performing the processing disclosed herein in real-time have been widely available for over a decade and are well-known to those having ordinary skill in the art.

Figure 5:
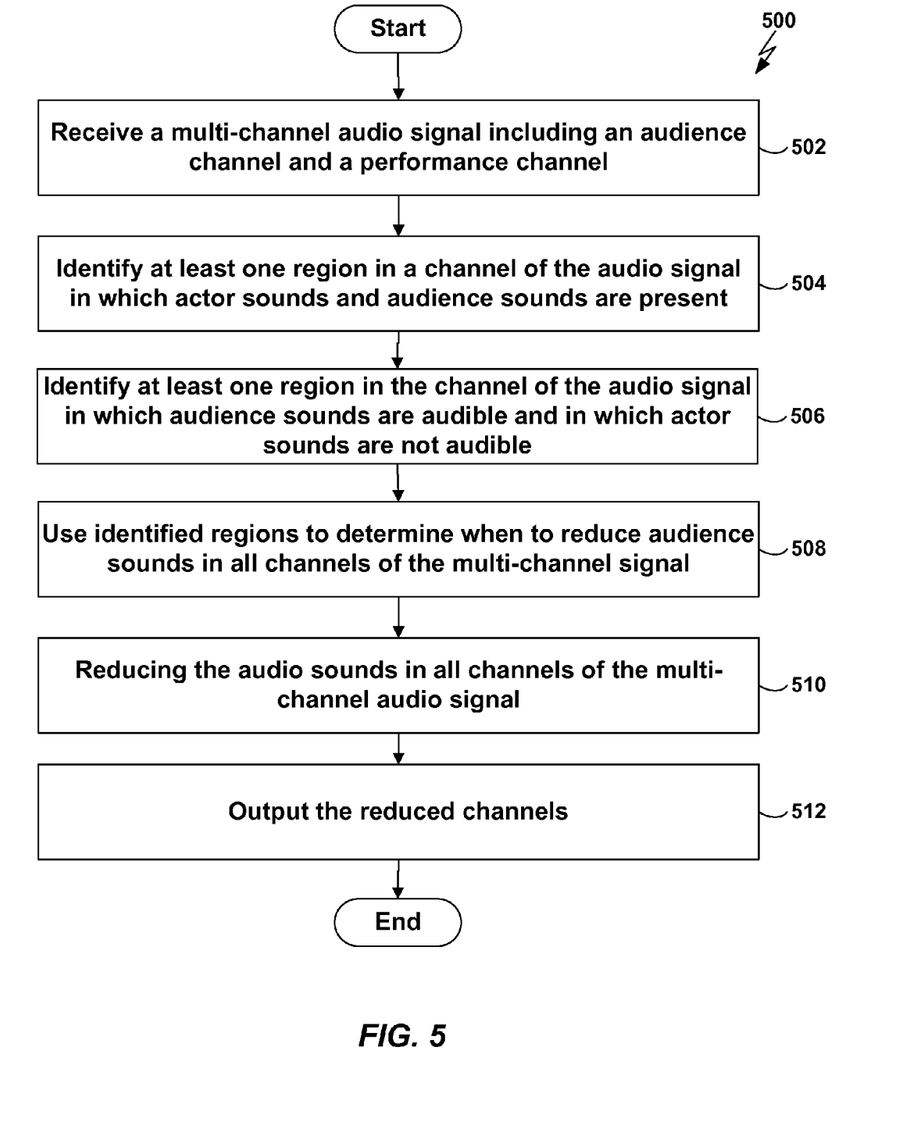
FIG. 5 is a flowchart of a method performed by another embodiment of the present invention.

Referring to FIG. 5, a flowchart is shown of a method 500 performed by one embodiment of the present invention. The method 500 of FIG. 5 may, for example, be performed by the audience removal module 300 of FIG. 3. The method 500 may (either in real-time or not): (a) receive a signal (such as an HDMI 5.1 signal) representing a plurality of audio channels, including at least one audience channel and at least one performance channel (FIG. 5, operation 502); (b) identify one or more regions, in a single channel of the received multi-channel (e.g., HDMI 5.1) audio signal, in which sounds (e.g., speech) of actors are present and sounds (e.g., laughter) of an audience are present (FIG. 5, operation 504); (c) identify one or more regions, in the same single channel, in which sounds of the audience are audible and in which sounds of the actors are not audible (FIG. 5, operation 506); (d) using the results of (a) and (b) (e.g., the identified regions of the single channel) to determine when to reduce or completely suppress the audience sounds in all channels, or at least in the audience channel and the performance channel, of the multi-channel audio signal (FIG. 5, operation 508); (e) performing such reducing or completely suppressing of the audience sounds in all channels of the multi-channel audio signal, or at least in the audience channel and the performance channel (FIG. 5, operation 510); and (f) either outputting the results as audio for listening, or recomposing the results into an output multi-channel (e.g., HDMI 5.1) audio signal. As this implies, the output signals 212a, 216, 210, 218, 214a may be recomposed into, and output by the module 200 as, multi-channel (e.g., HDMI 5.1) audio. Alternatively, the module 200 may output any one or more of the signals 212a, 216, 210, 218, and 214a individually for listening (i.e., not as part of multi-channel audio).

One benefit of this approach is that it may employ computations which assign weights to the importance of the audience sounds and to the importance of the performers' sounds, and then attenuate the signal in accordance with those weights. For example, if the audience sounds are weighted less heavily than the performers' sounds, then embodiments of the present invention may remove relatively more of the audience sounds from one or more (e.g., all) of the tracks in the input signal. This use of weights enables embodiments of the present invention to be configured flexibly to remove relatively more or less of the audience and performers' sounds, based upon preferences of the system designer and/or end user.

Another benefit of embodiments of the present invention is that they may be used to reduce or suppress audience sounds in the performance track only at frequencies where the audience sounds dominate over any actors' sounds. For example, the overall power of the audience tracks may be computed. Speech-acoustic landmarks and/or other techniques may be used to detect when the actors are speaking in the performance track. A pitch contour of the performance track may be calculated. The pitch contour may then be used to determine how much power from the performers' sounds is present, and how much power from sounds other than the performers' sounds are present in the performance track. The ratio of performers' power to total sounds power may be used to determine whether the performers or the other sounds dominate. For example, if the performers' power is less than one-half of the total, then the other sounds, especially the audience sounds, may be defined as dominating the performers. Alternatively, the ratio may be taken only for power computed over certain frequencies. As another alternative, the defining value of the ratio may be a value other one-half. This determination may then be used to determine how much of the audience sound to suppress in the performance track, and to perform such suppression.

Another benefit of embodiments of the present invention is that the processing that they perform may also be used to detect actors speaking through the use of objective speech analysis techniques such as speech-acoustic landmarks, pitch-tracking, and amplitude (volume). Embodiments of the present invention already use such processing to detect and remove audience sounds (e.g., laughter), so such processing may also be used to detect actors' speech without incurring significant additional overhead.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain embodiments of the present invention have been described in connection with HDMI 5.1 audio, this is merely an example and does not constitute a limitation of the present invention. Embodiments of the present invention may be used, for example, in connection with any plurality of audio channels, whether provided by cable, DVD, Internet streaming, or otherwise, and in any format, whether HDMI 5.1 or otherwise (including, but not limited to, formats other than HDMI).

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

For example, the system 100 of FIG. 1 and the modules 200 and 300 of FIGS. 2 and 3 may be implemented using any apparatus, such as by using any of the components disclosed herein in any combination. For example, any one or more of the system 100 of FIG. 1 and the modules 200 and 300 of FIGS. 2 and 3 may be implemented using one or more computer processors executing computer program instructions stored on one or more non-transitory computer-readable media to perform the methods disclosed herein.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may process signals in HDMI 5.1 format, which are not possible for a human to understand or to process according to the methods disclosed herein. As another example, the techniques disclosed herein may be performed in real-time or substantially in real-time. For example, the module 300 of FIG. 3 may produce its output signal 330 within 50 milliseconds of receiving its input signals 212a, 216, 210, 218, and 214a. Such calculations could not be performed in such a short period of time mentally and/or manually by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor, the method comprising:
    (1) receiving a signal representing a plurality of audio channels, wherein the plurality of audio channels includes an audience channel and a performance channel;
    (2) identifying at least one region, in the performance channel, in which sounds of performers and sounds of an audience are present;
    (3) identifying at least one region, in the performance channel, in which sounds of the audience are audible and sounds of the performers are not audible;
    (4) reducing sounds of the audience in the audience channel and the performance channel in the regions identified in (2) and (3), thereby producing a reduced audience channel and a reduced performance channel.

2. The method of claim 1, further comprising:
    (5) outputting the reduced audience channel; and
    (6) outputting the reduced performance channel.

3. The method of claim 1, further comprising:
    (5) outputting a multi-channel audio signal including the reduced audience channel and the reduced performance channel.

4. The method of claim 1, wherein (4) produces the reduced audience channel and the reduced performance channel in real-time relative to receipt of the signal in (1).

5. The method of claim 1, wherein the sounds of the audience include laughter of the audience.

6. The method of claim 1, wherein the sounds of the performers include speech of the performers.

7. The method of claim 1, wherein the signal representing the plurality of audio channels comprises an HDMI 5.1 signal.

8. The method of claim 1, wherein (4) comprises reducing the sounds of the audience only at frequencies at which the sounds of the audience dominate the sounds of the performers.

9. A non-transitory computer-readable medium comprising computer program instructions executable by at least one computer processor to perform a method, the method comprising:
- (1) receiving a signal representing a plurality of audio channels, wherein the plurality of audio channels includes an audience channel and a performance channel;
- (2) identifying at least one region, in the performance channel, in which sounds of performers and sounds of an audience are present;
- (3) identifying at least one region, in the performance channel, in which sounds of the audience are audible and sounds of the performers are not audible;
- (4) reducing sounds of the audience in the audience channel and the performance channel in the regions identified in (2) and (3), thereby producing a reduced audience channel and a reduced performance channel.

10. The non-transitory computer-readable medium of claim 9, wherein the method further comprises:
- (5) outputting the reduced audience channel; and
- (6) outputting the reduced performance channel.

11. The non-transitory computer-readable medium of claim 9, wherein the method further comprises:
- (5) outputting a multi-channel audio signal including the reduced audience channel and the reduced performance channel.

12. The non-transitory computer-readable medium of claim 9, wherein (4) produces the reduced audience channel and the reduced performance channel in real-time relative to receipt of the signal in (1).

13. The non-transitory computer-readable medium of claim 9, wherein the sounds of the audience include laughter of the audience.

14. The non-transitory computer-readable medium of claim 9, wherein the sounds of the performers include speech of the performers.

15. The non-transitory computer-readable medium of claim 9, wherein the signal representing the plurality of audio channels comprises an HDMI 5.1 signal.

16. The non-transitory computer-readable medium of claim 9, wherein (4) comprises reducing the sounds of the audience only at frequencies at which the sounds of the audience dominate the sounds of the performers.

17. A method performed by at least one computer processor, the method comprising:
- (1) receiving a signal representing a plurality of audio channels, wherein the plurality of audio channels includes:
  - an original music/sound effect track;
  - an audience track; and
  - a performance track;
- (2) filtering the original music/sound effect track to produce a filtered music/sound effect track;
- (3) subtracting the filtered music/sound effect track from the audience track to produce an audience estimate signal;
- (4) filtering the audience estimate signal to produce a filtered audience estimate signal;
- (5) subtracting the filtered audience estimate signal from the performance track to produce a deflated performance track;
- (6) applying a windowing function to the audience estimate signal to isolate at least one active audience region in the audience estimate signal;
- (7) applying the windowing function to the deflated performance track to isolate at least one active audience region in the deflated performance track; and
- (8) applying a time-frequency mask to the isolated active audio regions isolated in (6) and (7) to produce an estimated performance signal.

18. The method of claim 17, wherein (8) produces the estimated performance signal in real-time relative to receipt of the signal in (1).

19. The method of claim 17, further comprising:
- (9) calculating a pitch contour and a measure of voicing in the performance track to identify actor voice activity in the performance track.

20. The method of claim 17, further comprising:
- (9) calculating a pitch contour and a measure of voicing in the deflated performance track to identify actor voice activity in the deflated performance track.

21. A non-transitory computer-readable medium comprising computer program instructions executable by at least one computer processor to perform a method, the method comprising:
- (1) receiving a signal representing a plurality of audio channels, wherein the plurality of audio channels includes:
  - an original music/sound effect track;
  - an audience track; and
  - a performance track;
- (2) filtering the original music/sound effect track to produce a filtered music/sound effect track;
- (3) subtracting the filtered music/sound effect track from the audience track to produce an audience estimate signal;
- (4) filtering the audience estimate signal to produce a filtered audience estimate signal;
- (5) subtracting the filtered audience estimate signal from the performance track to produce a deflated performance track;
- (6) applying a windowing function to the audience estimate signal to isolate at least one active audience region in the audience estimate signal;
- (7) applying the windowing function to the deflated performance track to isolate at least one active audience region in the deflated performance track; and
- (8) applying a time-frequency mask to the isolated active audio regions isolated in (6) and (7) to produce an estimated performance signal.

22. The non-transitory computer-readable medium of claim 21, wherein (8) produces the estimated performance signal in real-time relative to receipt of the signal in (1).

23. The non-transitory computer-readable medium of claim 22, wherein the method further comprises:
- (9) calculating a pitch contour and a measure of voicing in the performance track to identify actor voice activity in the performance track.

24. The non-transitory computer-readable medium of claim 23, wherein the method further comprises:
- (9) calculating a pitch contour and a measure of voicing in the deflated performance track to identify actor voice activity in the deflated performance track.

\* \* \* \* \*